United States Patent [19]

Polsinelli et al.

[11] Patent Number: 5,568,830
[45] Date of Patent: Oct. 29, 1996

[54] PNEUMATIC TIRE AND RIM

[76] Inventors: Vincenzo V. Polsinelli, 79 Coons Road, Richmond Hill, Ontario, Canada, L4E 2R3; Edmund Daniel, 2004 Ardleigh Road, Oakville, Ontario, Canada, L6J 1V5

[21] Appl. No.: 415,452

[22] Filed: Apr. 3, 1995

[51] Int. Cl.⁶ .......................... B60B 21/10; B60B 25/10; B60C 5/22
[52] U.S. Cl. .................. 152/404; 152/339.1; 152/379.5; 152/342.1; 301/13.2
[58] Field of Search .............................. 152/339.1, 340.1, 152/342.1, 402, 403, 404, 409, 401, 379.5; 301/5.1, 9.1, 10.1, 29.2, 35.1, 95, 98, 13.2

[56] References Cited

U.S. PATENT DOCUMENTS

| | | | |
|---|---|---|---|
| 543,862 | 8/1895 | Gray | 152/339.1 |
| 1,976,235 | 10/1934 | Lawrence | 152/340.1 |
| 2,027,282 | 1/1936 | Mason | 152/340.1 |
| 2,045,860 | 6/1936 | Knapp | 152/340.1 |
| 2,641,295 | 6/1953 | Des Rosiers | 152/339.1 |
| 2,664,935 | 1/1954 | Des Rosiers | 152/339.1 |
| 2,990,869 | 7/1961 | Riley | 152/339.1 |
| 3,161,219 | 12/1964 | Danhi | 152/339.1 |
| 3,791,432 | 2/1974 | Calullerovich | 152/339.1 |

FOREIGN PATENT DOCUMENTS

| | | |
|---|---|---|
| 2008699 | 9/1971 | Germany . |
| 4200735 | 7/1993 | Germany . |
| 985 | of 1895 | United Kingdom . |
| 2252943 | 8/1992 | United Kingdom . |

*Primary Examiner*—Jeff H. Aftergut
*Assistant Examiner*—Francis J. Lorin
*Attorney, Agent, or Firm*—Olaf Nielsen

[57] ABSTRACT

There is disclosed a safety tire for motor vehicles which is comprised of a cord-reinforced body having a pair of generally radially extending outer sidewalls and a third center wall. The three walls terminate in inextensible tire beads which are adapted to seat on a rim and to form therewith two side-by-side, axially arranged, airtight chambers. The rim has two axially outer bead seats, and an axially inner bead seat formed by flanges each curving toward a respective tire chamber.

10 Claims, 2 Drawing Sheets

PNEUMATIC TIRE AND RIM

BACKGROUND OF THE INVENTION

Within the tire art, a great deal of effort and talent have been expended in creating so-called safety tires, i.e. tires which will seal themselves upon being punctured, or which have more than one air-chamber. As to the self-sealing variety, attempts have been directed at providing a tire which, when pierced, envelops the piercing objects and prevents air loss or actually plugs the puncture when the piercing object is removed or falls out.

Alternatively, tire structures have been proposed wherein multiple air-chambers are provided.- This latter field is the one to which the present invention is directed. One multiple-chamber approach may be seen, for example, in the following patents:

| Siedow | U.S. Pat. No. 3,318,325 | (1967) |
| --- | --- | --- |
| Krohn et al. | U.S. Pat. No. 3,361,153 | (1968) |
| Huber | U.S. Pat. No. 3,480,064 | (1969) |
| Hawkes | U.S. Pat. No. 3,422,836 | (1969) |
| Huber et al. | U.S. Pat. No. 3,476,168 | (1969) |
| Holl | U.S. Pat. No. 3,542,110 | (1970) |
| Betancourt | U.S. Pat. No. 3,844,325 | (1974) |
| Bezbatchenko et al. | U.S. Pat. No. 3,901,750 | (1975) |
| Abbott et al. | U.S. Pat. No. 5,176,764 | (1993) |

It will be noted that all of the above prior art patents are directed to concentric structures, with one chamber located radially outwardly of the other. One difficulty encountered in these radial arrangements is that, when the outer chamber is punctured and collapses, the puncturing object can, upon continued rotation of the tire, abrade the wall separating the inner and outer chambers, causing the inner chamber to collapse as well. Further, when the radially outer chamber loses its inflation pressure and collapses, the attitude of the vehicle and the weight distribution will change, since the rolling diameter of that particular wheel will now be reduced. This may likely cause a loss of vehicle control and stability.

It is thus an object of the present invention to provide a combination dual-chamber safety tire and rim which is able to continue carrying its vehicle load and maintain stability and control, even though one chamber may have been compromised by a puncture. It is a further object to provide a tire and rim combination wherein dual tire chambers are arranged side-by-side on a rim in such a manner that vehicle attitude will be maintained though air pressure is lost in one chamber. The above and additional objects and advantages of the present invention will become apparent to those skilled in the art from the following "Summary of the Invention" and "Detailed Description of a Preferred Embodiment."

SUMMARY OF THE INVENTION

The instant invention is directed to avoiding the problems experienced with concentric-chamber tires such as described above, and broadly to provide a safety tire having two axially adjacent chambers, in which a puncture will not result in loss of vehicle mobility or steering effectiveness. Thus, even though a puncture may deflate and disable one chamber, the neighboring chamber maintains its pressure and can safely support the vehicle and maintain its attitude, until repairs can be made.

The invention thus envisions a safety tire wherein dual chambers are arranged axially within a single tire, presenting two sealed, side-by-side compartments, each inflated independently.

The two axially outer walls of the tire extend radially inwardly from the tread area and terminate in first and second tire beads; a third wall, common to both chambers, extends radially through the center of the tire, terminating in a third bead. All three beads are preferably inextensible, and seat air tightly on portions of a rim which forms another portion of the present invention.

The rim broadly presents a structure having outer bead seats to accommodate the two axially outer tire beads, and a third, central bead seat for supporting the third tire bead. A preferred version of this rim comprises two sections which cooperate in supporting the three beads. Still further, the invention envisions the combination of a tire having three radial walls terminating in beads with a rim having two axially spaced bead seats and a third, central bead seat therebetween.

DETAILED DESCRIPTION OF A PREFERRED EMBODIMENT

Figure 1:
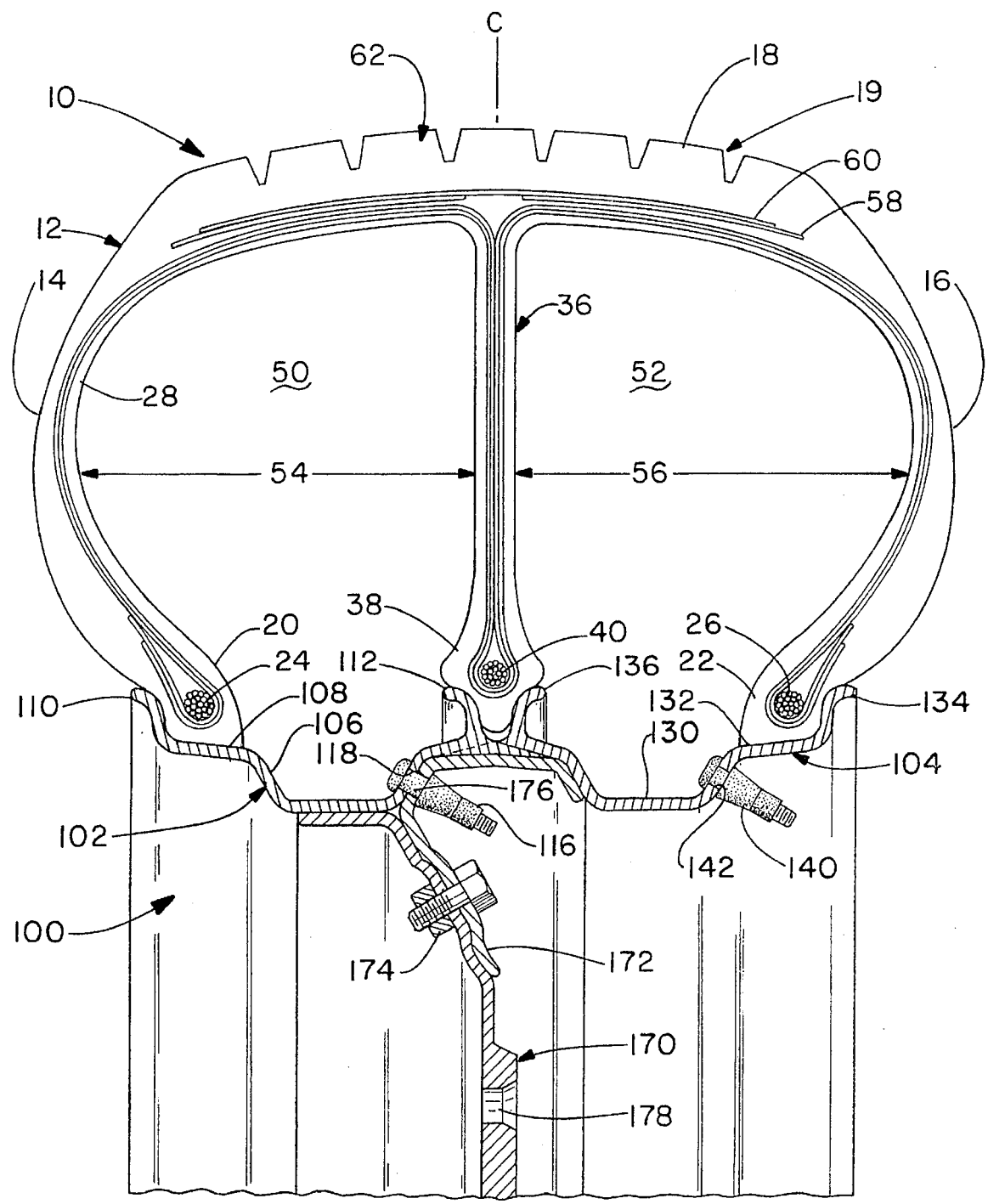
FIG. 1 is a transverse cross-sectional view of the tire and the rim of the invention.
Figure 2:
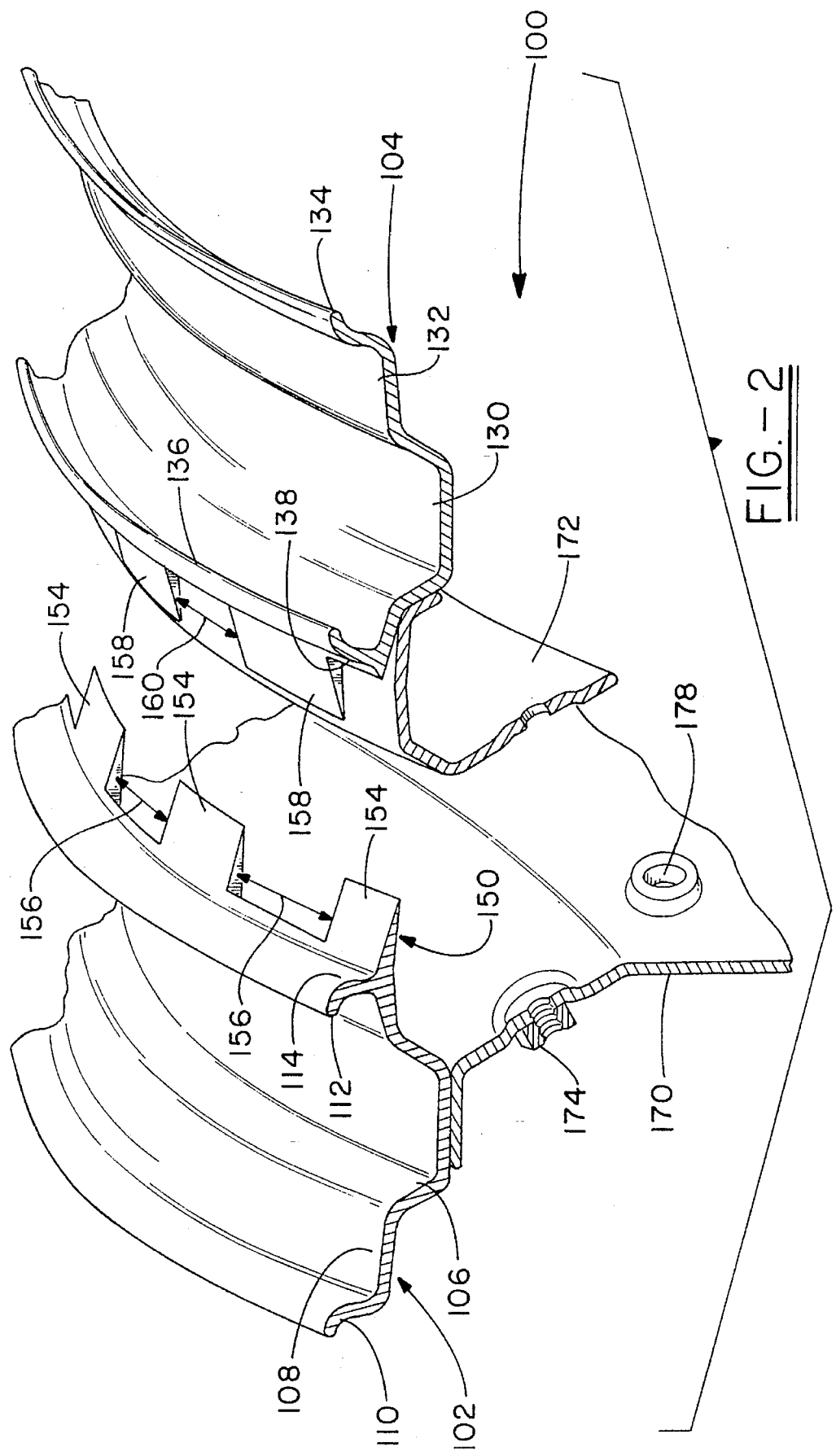
FIG. 2 is a partial assembly in cross-section of the rim of the invention.

As best seen in FIG. 1, there is shown a pneumatic tire 10, whose body 12 is comprised or cord-reinforced elastomeric material. Its toroidal configuration makes it useful in passenger automobile applications, and as such it exhibits axially spaced, outwardly bowed sidewalls 14 and 16, terminating radially outwardly at, and joining, an annular road-engaging tire tread 18 at the crown area 19 of the tire.

The walls 14 and 16 terminate radially inwardly in tire beads 20 and 22, provided with hoop-like wire bead-bundles 24 and 26, respectively. This renders them inextensible and allows the beads to be seated air tightly on the left and right portions, respectively, of the associated rim 100, as will be more fully described hereafter.

A third wall 36 extends radially inwardly from the tire crown 19 and generally along the median plane C of the tire, to divide it into two compartments. It terminates in bead 38, reinforced with wire-bundle 40, and is sealingly seated on the rim 100.

When the three-walled tire 10 is properly seated on its associated rim 100, there is thus created a structure comprised of two separate, axially adjacent safety compartments 50 and 52, separated by the third wall 36, and capable of independent pressurization. Safety compartment 50 is created between tire body portion 54 and the left rim portion, while compartment 52 is formed by tire body portion 56 and the right rim portion.

The tire 10 is shown as a so-called radial tire, in which the cords of the cord-reinforced elastomeric body 12 extend generally radially from the bead 20, to bead 38, thence to bead 22, and thus generally at right angles to the median plane C.

The radial type of tire may usefully be constructed in a two-stage process, which in the present instance is adapted to produce a tire having the additional third, radial wall 36.

In the first stage of a well-known two-stage process, unvulcanized, or so-called "green", body plies of cord-reinforced elastomer material are wound around a cylindrical drum to form a tire body 12. For purposes of illustration, the tire is shown as tubeless, and the innermost layer on the drum therefore comprises air-impervious elastomeric material 28. Inextensible wire bead-bundles 24 and 26 are placed at each end of the drum and the body plies wrapped around and anchored to them to form beads 20 and 22. A third wire-bundle 40 is placed around the center of the drum, on top of the tire body.

Typically, elastomeric layers forming the rubbery sidewalls of the tire are applied at this stage. With the bead bundles in place, the tire body cylinder is removed from the first-stage drum and placed on a second-stage machine, again comprising basically a cylindrical drum structure.

Underlying the tire body portion 54 between beads 20 and 38, and the tire body portion 56 between beads 38 and 22, respectively, are inflatable bladders well-known in the art. Inflating the bladders while moving beads 20 and 22 axially toward each other and toward the bead bundle 40, causes the bladders to rise radially outwardly, expanding the body portions 54 and 56 into toroidal chambers 50 and 52, respectively.

As the bladders and the tire body portions rise radially, the portions of the body adjacent the central bead bundle 40 will be pressed together progressively and adhere to form the central bead 38 and the central wall 36.

Elastomeric filler materials may be applied as necessary, such as, for example, at the beads 20, 22 and 38, and between the body plies at the radial outer end of the central wall 36.

With the tire body now in a basically toroidal shape, the tread plies, or belts, may be applied on top of the tire body. As is known in the art, belts used on radial tires generally comprise green cord material which extends circumferentially of the tire and therefore is substantially inextensible in the radial direction. The tread belts thus applied after the tire body has expanded, may be of a width to overlie each compartment 50 and 52 separately, such as 58, or may extend the entire width of the tread, as at 60, or may comprise combinations of widths.

On top of the tread belts is placed an annular, green tire tread 62 of an elastomeric composition best suited for the service intended. The tire array, with the bladders in place, may now be vulcanized, or cured, using traditional media of temperature and fluid pressure, within the bladders and/or in the surrounding mold portions.

Curing molds whose half-portions open and close somewhat like clamshells are well-known in the art and provide heated metal halves each adapted to engage, for example, a tire bead, a sidewall and a portion of the tread. Thus, tire bead diameters may be fixed, tire outer sidewall surfaces may be contoured, and desired tread designs may be imparted.

In the present case, a first mold half may engage bead 20, sidewall 14 and a portion of tread 62; a second mold half would engage bead 22, sidewall 16 and the remainder of the tread 62. As is also well-known within the tire art, various types of plates and rings, both solid and collapsible, have been used to create beads having special contours, such as, for example, the ledge 20 on the beads 22 in U.S. Pat. No. 3,318,325 to Siedow. It is intended that such a mold-ring or -plate, available between the mold halves, will shape the central bead 38. It will be noted that the radial inner diameters of the beads 20 and 22 are preferably shaped against the metal of the mold, in order to provide in the final product the controlled diameter surfaces which will seat as required on the rim.

The rim is indicated generally at 100, and is comprised of cooperating left and right axial rim portions 102 and 104, respectively.

These left and right rim portions may also be regarded as, respectively, "inner" and "outer" portions. The "inner" portion 102, when the rim is mounted on a vehicle, faces inwardly toward the body of the vehicle, while the "outer" portion faces outwardly, away from the vehicle. Similarly, the left tire sidewall 14 may be considered the inner sidewall, and sidewall 16 the outer. Likewise, the bead 20 may be considered the inner bead, and bead 22 the outer.

The left rim portion 102 has a drop center portion 106 to facilitate the mounting of tire bead 20. Adjoining the drop center portion is an inclined, or conical, bead seat 108 adapted to carry bead 20 airtightly, and terminating in a generally radially outwardly extending curved bead flange 110. At the opposite side of the drop center portion is located a second radial flange 112 having an axially outer face constituting a bead seat portion 114. In other words, left rim portion 102 comprises two flanges, 110 and 112, with a bead seat located between them, and a bead seat portion 114 at the axially outer face of flange 112. The function of parts 112 and 114 will be further explained hereafter.

An inflation valve 116 is secured in an opening 118 in the drop center portion 106.

Turning now to the outer, or right, axial rim portion 104, there is provided a drop center portion 130 and, again, an outer inclined bead seat 132 for airtightly carrying tire bead 22, and terminating in a radial curved flange 134. At the opposite side of drop center portion 130 is located a second bead flange 136 with bead seat portion 138. Thus, right rim portion 104 comprises flanges 134 and 136, a bead seat 132 between them, and a bead seat portion 138 at the axially outer face of flange 136. Again, the function of parts 136 and 138 will be discussed below.

Flanges 112 and 136 are curved toward their respective compartments 50 and 52.

Inflation valve 140 is lodged in opening 142 in the drop center portion 130.

The left and right rim portions 102 and 104 are adapted to interengage at their axially inner edge portions 150 and 152 in the following manner. The axial rim edge portion 150 is notched to create circumferentially spaced fingers or tongues 154 and recesses 156, giving the edge a crenelated appearance. Similarly, rim edge portion 152 is notched to form circumferentially spaced fingers or tongues 158 and recesses 160, likewise creating a crenelated appearance.

It will be seen that notches and fingers alternate. In this manner, as the two rim portions 102 and 104 are moved axially into engagement to form a central bead support, the fingers will bypass each other, with fingers 154 entering notches 160 and proceeding under the base of rim flange 136; at the same time, fingers 158 enter notches 156 and proceed underneath the base of rim flange 112.

Rim section 102 is fastened to wheel disk 170, as by welding, while rim section 104 is shown affixed to an annular ring 172, as by welding. The ring 172 interfits with rim portion 102 and wheel disk 170, and may be fastened to the disk 170 as by a plurality of bolting means 174. An opening 176 is provided in ring 172 to allow unobstructed passage therethrough of the inflation valve 116 seated in rim portion 102.

The disk wheel 170 has a central opening to accommodate the wheel hub, and is provided with a plurality of circumferentially spaced openings 178 to facilitate means for fastening the wheel to the hub.

A standard method of mounting a tire on a rim is to support the rim horizontally, and to apply the tire beads over the upper bead flange, utilizing the drop center feature of the rim.

In the instant case, the disk wheel-, or inner rim-, section 102 may be so supported, and the inner bead 20 passed, or buttoned, over the rim flange 112. The flange 136 of outer rim portion 104 is buttoned inside the outer bead 22, again utilizing the drop center feature of the rim portion. In this manner, the inner bead 20 is now adjacent its associated seat 108, while outer bead 22 is near its seat 132. The central bead 38 remains located between the still spaced-apart central bead seat portions 114 and 138.

With continued movement of the outer rim portion 104 toward inner rim portion 102, the fingers 154 enter notches 160, while fingers 158 enter notches 156; thus, bead seat portions 114 and 138 combine to create a complete seat for central bead 38. As the rim sections mate completely, and are fastened together as by means 174, the flanges 112 and 136 enclose bead 38 and clamp it airtightly.

Dimensions are so designed, as practiced in the art, that a slight interference fits exists between the inner and outer beads 20 and 22 and their respective bead seats 108 and 132, i.e. the radial inside diameter of the bead is slightly less than the radial outer diameter of the associated bead seat. Since the two bead seat portions 114 and 138 must slide together under the central bead 38, no interference fit is here intended.

While the rim is still supported on the tire-mounting machine, gravity tends to cause the inner bead 20 to move downward and contact the edge of its bead seat 108; inflation pressure applied through valve 116 will cause the bead 20 to climb up onto its bead seat 108 and there become sealed airtightly. As to the outer bead 22, slight manipulation of the tire, while applying inflation pressure through valve 140, will most frequently suffice to get the bead to engage and then climb onto its seat and seal there. Alternatively, an annular band, well-known in the industry, may be placed around the outer tire sidewall 16 to bridge the gap between it and rim flange 134, while inflation pressure is applied.

There is thus created two axially adjacent safety chambers capable of independent pressurization.

It will be appreciated that various modifications may be made by those skilled in the art, without departing from the scope of the invention.

We claim:

1. In combination, a two-compartment pneumatic tire, and a rim therefor, said rim comprising first and second axially spaced outer bead seats each terminating in a rim flange, and a pair of axially inner, spaced rim flanges between said first and second bead seats, each axially inner rim flange curving toward a respective tire-compartment and forming a portion of a third bead seat, said tire comprising first and second sidewalls terminating in beads seated, respectively, on said first and second bead seats, and a third, central wall terminating in a central bead seated on said portions of said bead seat.

2. The combination of claim 1, and rim edges extending axially beyond each of said third bead seat portions, said rim edges circumferentially notched to form interengaged fingers.

3. The combination of claim 1, and inflating means in said rim.

4. The combination of claim 1, wherein said rim comprises first and second cooperating portions, and means joining said rim portions, said joining means comprising an annular ring on said first rim portion, a wheel disk carrying said second rim portion, and means fastening said ring and said wheel together.

5. The combination of claim 1, wherein said third bead seat portions clamp said central bead.

6. A rim for a two-compartment pneumatic tire comprising first and second axially spaced outer bead seats each terminating in a rim flange, and a pair of axially inner, spaced rim flanges between said first and second bead seats, each said axially inner rim flange curving toward a respective tire compartment, and forming a third bead seat.

7. A rim as in claim 6, wherein said rim comprises first and second cooperating portions, each said portion comprising a said outer bead seat and a said inner rim flange.

8. A rim as in claim 7, and a rim edge extending axially beyond each said inner flange and notched circumferentially to form interengaging fingers.

9. A rim as in claim 6, and inflating means between said third bead seat and said first and second bead seats, respectively.

10. A rim as in claim 7, and means joining said rim portions comprising an annular ring on said first rim-portion, a wheel disk carrying said second rim portion, and means fastening said ring and said wheel disk together.

* * * * *